Oct. 31, 1939.  J. W. VANDERVEER  2,178,316
DEMONTABLE RIM WHEEL
Filed Feb. 16, 1927  2 Sheets-Sheet 1

Jewell W. Vanderveer
INVENTOR.

BY
ATTORNEYS.

Oct. 31, 1939.   J. W. VANDERVEER   2,178,316
DEMONTABLE RIM WHEEL
Filed Feb. 16, 1927   2 Sheets-Sheet 2
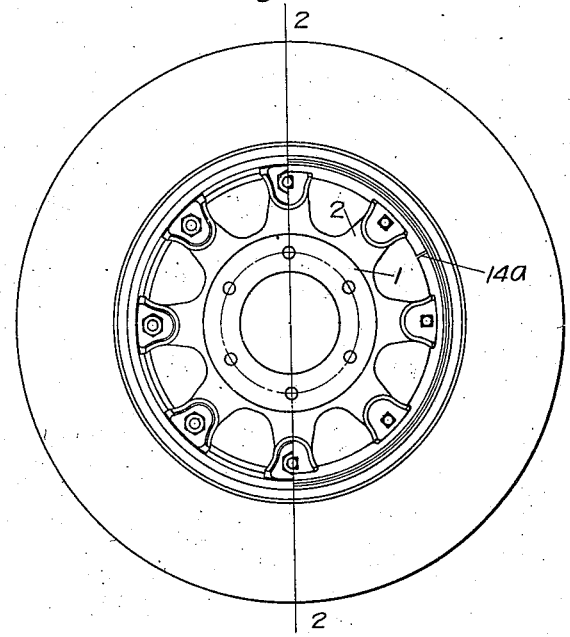
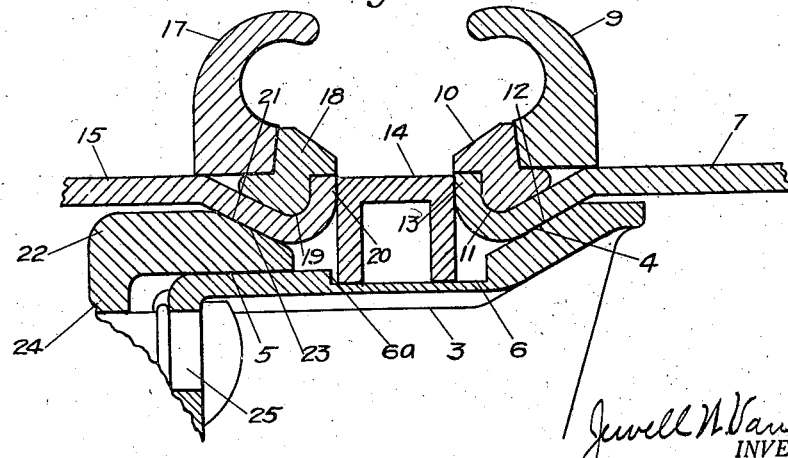

Patented Oct. 31, 1939

2,178,316

UNITED STATES PATENT OFFICE 2,178,316

DEMOUNTABLE RIM WHEEL

Jewell W. Vanderveer, Erie, Pa., assignor, by mesne assignments, to Erie Malleable Iron Company, Erie, Pa., a corporation of Pennsylvania Application February 16, 1927, Serial No. 168,728

22 Claims. (Cl. 301—13)

Demountable rims are usually forced into clamping engagement with a tapered peripheral surface. In forcing the rim to place on such surfaces it is not unusual to force the part of the rim initially operated upon beyond the point of what should be the final alinement of the rim. As a result the opposite side of the rim cannot be forced lateraly as far as the initial part of the rim and in consequence the rim is not in alinement with a plane at right angles to the axis of the wheel—in other words, it gives to the tire, or wheel a wobbling action. The present invention is designed to obviate this difficulty and inasmuch as this is apt to be more pronounced in dual wheels in its preferred form is so applied. The device is further directed to an improvement in dual wheel construction in affording a spacing means between the rims of the wheel. Details and features of the invention will appear more fully from the specification and claims.

A preferred embodiment of the invention is illustrated in the accompanying drawings as follows:

Fig. 2 shows a side elevation of the wheel, the right half of the figure showing the outer tire and rim removed.

Figure 1:
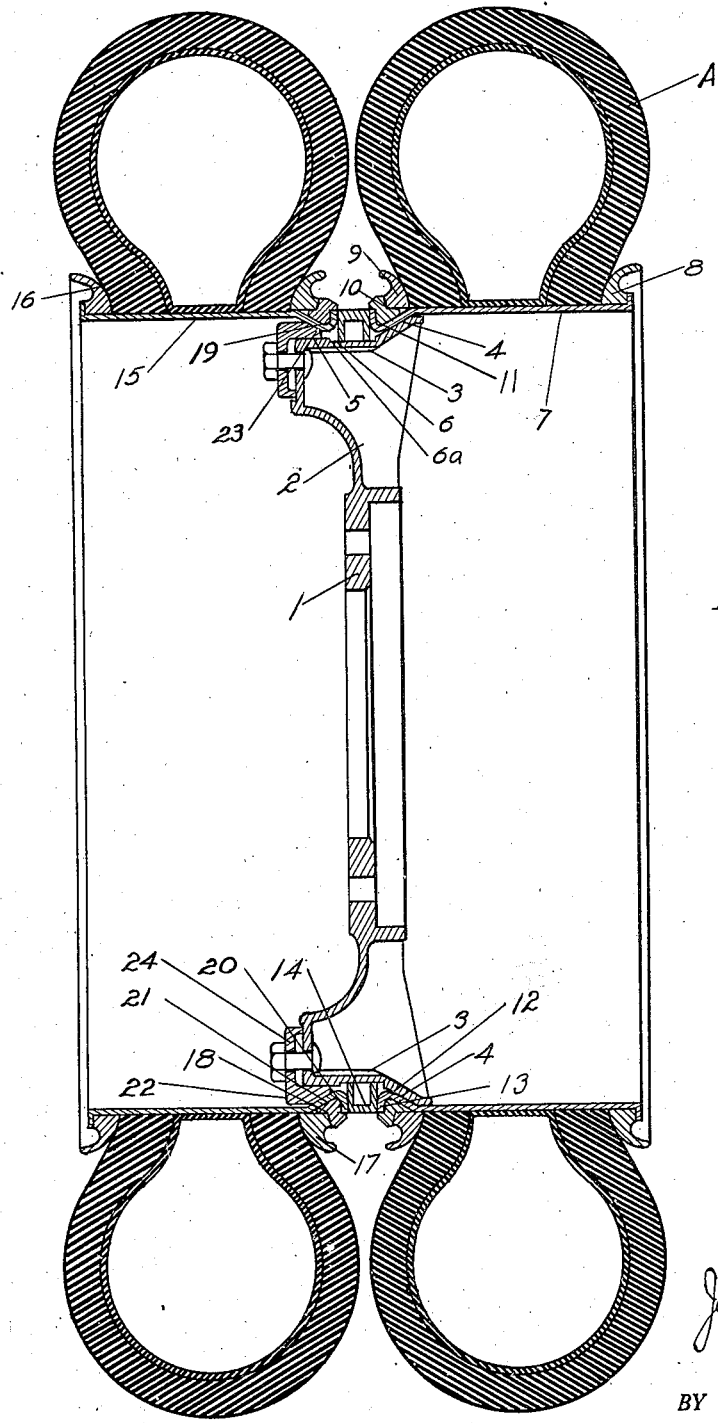
Fig. 1 shows a section on the line 2—2 in Fig. 2.

Fig. 3 an enlarged sectional view of the devices immediately involved in demountably securing the rims on the wheel.

1 marks the wheel hub, or flange, 2 the spokes extending therefrom, and 3 transverse heads at the outer ends of the spokes of the wheel.

The heads 3 have beveled surfaces 4 at the inner ends of the heads and seating surfaces 5 adjacent to the outer ends of the heads and depressions, or grooves, extending circumferentially across the heads at 6, the outer wall of the grooves forming alining shoulders 6a.

The inner rim 7 has tire supporting rings 8 and 9, the detachable ring 9 being keyed by a key ring 10 arranged in the trough 11 at the outer edge of the rim 7. The inner wall of the rim formed by the trough forms a beveled surface 12 adapted to engage the surface or seat 4 and provides an outer shoulder on the rim at 13.

A spacing ring 14 is arranged within the groove 6 and abuts against the outer shoulder 13. This ring is preferably channel shaped giving it considerable strength radially and the base of the channel is directly in line with the shoulder 13 thus receiving the crowding strain for clamping and seating the rim as hereinafter described. The ring 14 is severed at 14a and is sufficiently resilient to permit of its expansion to move it to place over the surfaces 5 into the grooves 6.

The outer demountable rim 15 has rings 16 and 17, the inner ring being secured by a detachable key ring 18 seated in a trough 19, the shoulder 20 formed by the trough engaging the split ring 14 opposite the shoulder 13 and the surface of the rim opposite the trough forming a beveled surface 21.

Clamping plates 22 have the cam, or beveled surfaces 23 which engage the surfaces 21, these plates having a downwardly extending lip, or flange 24, and clamping bolts 25 extend through the outer walls of the heads 3 through the lips 24 of the clamping plates, drawing these plates inwardly against the beveled surfaces 21.

In demounting the rims, the plates 22 are loosened and withdrawn. This permits the direct removal of the outer rim and if it is desired to remove the inner rim the split ring 14 is sprung over the outer surface and this permits of the removal of the inner rim. The handling of the single split ring simplifies the removal of the inner rim.

In reassembling the inner rim it is placed on the beveled surface 4 in the usual manner. The split ring 14 is then snapped into place behind the shoulders 6a. These alined shoulders assure the location of the rim 7 in approximate alinement with a plane at right angles with the axis. Sufficient clearance is allowed between the shoulder 6a and the split ring 14 to assure the easy entry of the ring and when in place it holds the entire rim in substantial alinement so that the initial part of the rim which is clamped in place cannot be forced inwardly a distance to seriously effect the alinement. This lack of alinement is a problem more particularly present in relation to dual wheels in which the inner rim overhangs the wheel as there is a tendency with the support only at the outer edge of this rim for the lower part of the rim to swing outwardly and the natural part of the rim to force to position initially is the top. The ring 14 is held in place not only by its resilience but when the parts are clamped the ring is also securely clamped by the axial thrust. The shoulder 6a extends circumferentially sufficiently to aline the part. As shown the shoulder is not continuous but I do not wish to be limited to a shoulder broken away at intervals as in the specific embodiment by the spaces between the spokes.

Tires A—A are placed upon the rims in the usual manner.

What I claim as new is:

1. A vehicle wheel having a tapered seat at its outer periphery; a demountable rim having an engaging surface only at one edge engaging said seat; alined means initially and positively locating the rim in alinement with a plane at right angles to the axis of the wheel; and clamping means forcing the engaging surface of the rim and seat together.

2. A vehicle wheel having a fixed unobstructed tapered seat on its outer periphery; a demountable rim having an engaging surface only at one edge engaging said seat; alined means initially and positively locating the rim in alinement with a plane at right angles to the axis of the wheel; and clamping means forcing the engaging surface of the rim axially onto said seat, the axial movement of the rim being limited only by the taper of the seat.

3. A vehicle wheel having an unobstructed tapered seat at its outer periphery; a demountable rim having an engaging surface only at one edge engaging said seat; alined means positively locating the rim in alinement with a plane at right angles to the axis of the wheel comprising a circumferentially extending and alined shoulder and detachable means operating between the shoulder and the rim for alining the same; and clamping means forcing the engaging surface of the rim and seating surface together, the clamping action being limited only by the taper of the seat.

4. A vehicle wheel having a tapered seat at its outer periphery; a demountable rim engaging said seat; alined means positively locating the rim in alinement with a plane at right angles to the axis of the wheel comprising a circumferentially extending and alined shoulder and a self closing ring between the shoulder and the rim, said rim being removable over the shoulder to permit the demounting of the rim; and clamping means clamping the ring and rim together and forcing the rim and seat together.

5. A vehicle wheel having an unobstructed fixed seat at its outer periphery; a demountable rim engaging said seat; alined means positively locating the rim in alinement with a plane at right angles to the axis of the wheel comprising a circumferentially extending and alined shoulder and a self closing ring between the shoulder and the rim, said rim being removable over the shoulder to permit the demounting of the rim over the shoulder; and clamping means clamping the ring and rim together and forcing the rim and seat together, the clamping action being limited only by the taper of the seat.

6. A vehicle wheel comprising a tapered axially inner seat at its outer periphery; an inner rim engaging said inner seat; an outer rim arranged on the periphery; means between the rims positively alining said rims in alinement with a plane at right angles to the axis of the wheel, said alining means comprising a removable member permitting the outward demounting of the inner rim; and means clamping said alining means and inner rim together with the inner rim engaging said seat.

7. A vehicle wheel comprising a tapered and fixed axially inner seat in its periphery; an inner rim engaging said seating surface; means positively alining said rim on said seat; an outer rim on the periphery; and means acting through the alining means forcing said inner rim axially onto said seat and clamping both rims on the wheel.

8. A vehicle wheel comprising a tapered axially inner seat at its outer periphery; an inner rim engaging said inner seat; an outer rim on the periphery; means positively alining said rims on said seats comprising a circumferentially extending and alined shoulder on the wheel periphery between the rims and alining means positioned by the shoulder and acting to positively aline said rims; and means clamping said outer and inner rims in place, said clamping means acting on the outer rim and through the alining means upon the inner rim.

9. A vehicle wheel comprising a tapered and fixed axially inner seat on its outer periphery; an inner rim engaging said inner seat; means positively alining said rim on said seat comprising a circumferentially extending and alined shoulder on the wheel periphery and a ring interposed between the shoulder and the inner rim; an outer rim arranged on the periphery; and means clamping said outer and inner rims on the periphery, said ring forming a spacer between said rims and communicating the clamping movement to the inner rim.

10. A vehicle wheel having inner and outer rims thereon; unobstructed tapered seats engaged by said rims; alining means positioned between said rims positively alining said rims with a plane at right angles to the wheel; and clamping means forcing said rims and seats together, the clamping action being limited only by the tapers of the seats.

11. A vehicle wheel having inner and outer rims having oppositely arranged engaging surfaces only on one edge of each rim; unobstructed tapered seats on the wheel engaging said surfaces; alining means positively alining said rims in alinement with a plane at right angles to the axis of the wheel and alining the inner rim prior to clamping; and clamping means forcing said surfaces and seats together, securing the rims in place, said alining means being between the rims and comprising a removable member permitting the outward demounting of the inner rim.

12. A vehicle wheel comprising a tapered axially inner seat at its outer periphery; an inner rim engaging said inner seat; an outer rim arranged on the periphery; means between the rims positively alining said rims in alinement with a plane at right angles to the axis of the wheel, said alining means being removable to permit the outward demounting of the inner rim; and means clamping said alining means and inner rim together with the inner rim engaging said seat.

13. A demountable rim and wheel assembly comprising associated parts forming a wheel member having a tapered rim seat thereon facing axially outward; a rim member having a single tapered seat on its inner periphery engaging the tapered wheel seat; and means alining the rim member in a plane at right angles to the axis of the wheel extending circumferentially along the members and comprising a face fixed relatively to the wheel member and an opposing abutting part associated and moving with the rim member and blocking through the abutting engagement with said face an axially outward movement of the rim member in response to axial pressure exerted on any part of the rim in a direction seating the tapered surfaces; and clamping means extending circumferentially along the rim exerting pressure axially setting the assembly with the tapered seats in clamping seating relation and the engagement of the tapered seats limiting the clamping action.

14. A demountable rim and wheel assembly comprising associated parts forming a wheel member having a tapered rim seat thereon facing axially outward; a rim member having a single tapered seat on its inner periphery engaging the tapered wheel seat; and means positioned axially outwardly of the tapered seats alining the rim in a plane at right angles to the axis of the wheel extending circumferentially along the members and comprising a face fixed relatively to the wheel member and an opposing abutting part associated and moving with the rim member and blocking through the abutting engagement with said face axially outward movement of the rim member in response to axial pressure exerted on any part of the rim in a direction seating the tapered surfaces; and clamping means extending circumferentially along the rim exerting pressure axially setting the assembly with the tapered seats in clamping seating relation and the engagement of the tapered seats limiting the clamping action.

15. A demountable rim and wheel assembly comprising associated parts forming a wheel member having a tapered rim seat thereon facing axially outward; a rim member having a single tapered seat on its inner periphery engaging the tapered wheel seat; and removable means positioned axially outwardly of the tapered seats alining the rim in a plane at right angles to the axis of the wheel extending circumferentially along the members and comprising a face fixed relatively to the wheel member and an opposing abutting part associated and moving with the rim member and blocking through the abutting engagement with said face axially outward movement of the rim member in response to axial pressure exerted on any part of the rim in a direction seating the tapered surfaces; and clamping means extending circumferentially along the rim exerting pressure axially setting the assembly with the tapered seats in clamping seating relation and the engagement of the tapered seats limiting the clamping action.

16. A dual demountable rim and wheel assembly comprising associated parts forming a wheel member having a tapered inner rim seat thereon facing axially outward; an inner rim member having a tapered seat on its inner periphery engaging the inner tapered wheel seat; an outer rim member mounted on the wheel; and means between the rims alining the inner rim member in a plane at right angles to the axis of the wheel extending circumferentially along the members and comprising a face fixed relatively to the wheel member and an opposing abutting part associated and moving with the inner rim member and blocking through the abutting engagement of said face axially outward movement of the inner rim member in response to axial pressure exerted on any part of the inner rim in a direction seating the tapered surfaces; and clamping means extending circumferentially along the wheel exerting pressure axially seating the assembly including both rims with the inner tapered seats in clamping seating relation and the engagement of the tapered seats limiting the clamping action, said outer rim member being alined through the operation of the alining means at right angles to the axis of the wheel.

17. A dual demountable rim and wheel assembly comprising associated parts forming a wheel member having a tapered inner rim seat thereon facing axially outward; an inner rim member having a tapered seat on its inner periphery engaging the inner tapered wheel seat; an outer rim member mounted on the wheel; and means between the rims alining the inner rim member in a plane at right angles to the axis of the wheel extending circumferentially along the members and comprising a face facing axially fixed relatively to the wheel member and an opposing abutting part associated and moving with the inner rim member and blocking through the abutting engagement of said face axially outward movement of the inner rim member in response to axial pressure exerted on any part of the inner rim in a direction seating the tapered surfaces; and clamping means extending circumferentially along the wheel exerting pressure axially seating the assembly including both rims with the inner tapered seats in clamping seating relation and the engagement of the tapered seats limiting the clamping action, said outer rim member being alined through the operation of the alining means at right angles to the axis of the wheel.

18. A demountable rim and wheel assembly comprising associated parts forming a wheel member having a tapered rim seat thereon facing axially outward; a rim member having a single tapered seat on its inner periphery engaging the tapered wheel seat; and means alining the rim in a plane at right angles to the axis of the wheel extending circumferentially along the members and comprising a face fixed relatively to the wheel member and an opposing abutting part associated and moving with the rim member and blocking a radially outward and axially inward movement of the rim member at any point along the slope of the tapered seat in response to axial pressure by blocking a backward axially outward movement of the rim at any point of the rim through the abutting engagement of the abutting part with the face; and clamping means exerting pressure axially setting the assembly with the tapered seats in clamping seating relation and the engagement of the tapered seats limiting the clamping action.

19. A demountable rim and wheel assembly comprising associated parts forming a wheel member having a tapered rim seat at its outer periphery facing axially outward; a rim member having a tapered seat only at one edge of its inner periphery engaging the tapered wheel seat; and aligned means initially and positively locating the rim in a plane at right angles to the axis of the wheel extending circumferentially along the members and comprising a face fixed relatively to the wheel member and an opposing abutting part associated and moving with the rim member and blocking a radially outward and axially inward movement of the rim member at any point along the slope of the tapered seat in response to axial pressure by blocking a radially inward movement of the rim member at any point of the rim through the abutting engagement of the abutting part with the face; and clamping means exerting pressure axially setting the assembly with the tapered seats in clamping seating relation and the engagement of the tapered seats limiting the clamping action.

20. A demountable rim and wheel assembly comprising associated parts forming a wheel member having a tapered rim seat thereon facing axially outward; a rim member having a tapered seat on its inner periphery engaging the tapered wheel seat; and removable means positioned axially outwardly of the tapered seats alining the rim in a plane at right angles to the axis of the wheel extending circumferentially along the members and comprising a face facing axially and fixed relatively to the wheel member and an opposing abutting part associated and moving with the rim member and blocking a radially outward and axially inward movement of the rim member at any point along the slope of the tapered seat in response to axial pressure by blocking a backward axially outward movement of the rim at any point of the rim through the abutting engagement of the abutting part with the face; and clamping means extending circumferentially along the wheel exerting pressure axially seating the assembly with the inner tapered seats in clamping seating relation and the engagement of the tapered seats limiting the clamping action.

21. A demountable rim and wheel assembly comprising associated parts forming a wheel member having a tapered rim seat at its outer periphery facing axially outward; a rim member having a tapered seat only at one edge of its inner periphery engaging the tapered wheel seat; and removable aligned means positioned axially outwardly of the tapered seats initially and positively locating the rim in a plane at right angles to the axis of the wheel extending circumferentially along the members and comprising a face fixed relatively to the wheel member and an opposing abutting part associated and moving with the rim member and blocking a radially outward and axially inward movement of the rim member at any point along the slope of the tapered seat in response to axial pressure by blocking a radially inward movement of the rim member at any point of the rim through the abutting engagement of the abutting part with the face; and clamping means extending circumferentially along the wheel exerting pressure axially seating the assembly including both rims with the inner tapered seats in clamping seating relation, the engagement of the tapered seats limiting the clamping action, said outer rim member being alined through the operation of the alining means at right angles to the axis of the wheel.

22. A demountable rim and wheel assembly comprising associated parts forming a wheel member having a tapered rim seat thereon facing axially outward; a rim member having a tapered seat on its inner periphery engaging the tapered wheel seat; and means aligning the rim member in a plane at right angles to the axis of the wheel extending circumferentially along the members and comprising a face facing axially and fixed relatively to the wheel member and an opposing abutting part associated and moving with the rim member and blocking through the abutting engagement with said face axially outward movement of the rim member in response to axial pressure exerted on any part of the rim in a direction seating the tapered surfaces; and clamping means extending circumferentially along the rim exerting pressure axially setting the assembly with the tapered seats in clamping seating relation and the engagement of the tapered seats limiting the clamping action.

JEWELL W. VANDERVEER.